US012408638B2

(12) United States Patent
Zito, Jr. et al.

(10) Patent No.: US 12,408,638 B2
(45) Date of Patent: Sep. 9, 2025

(54) RESPONSIVE DISPERSION FROM COMPARTMENT IN AQUEOUS SOLUTION

(71) Applicants: Arthur J. Zito, Jr., Swampscott, MA (US); William R. Zito, Millersville, MD (US)

(72) Inventors: Arthur J. Zito, Jr., Swampscott, MA (US); William R. Zito, Millersville, MD (US)

(*) Notice: Subject to any disclaimer, the term of this patent is extended or adjusted under 35 U.S.C. 154(b) by 313 days.

(21) Appl. No.: 18/312,423

(22) Filed: May 4, 2023

(65) Prior Publication Data

US 2024/0365758 A1     Nov. 7, 2024

Related U.S. Application Data

(63) Continuation of application No. 15/746,115, filed on Jan. 19, 2018, now Pat. No. 11,690,309.

(51) Int. Cl.
| | | |
|---|---|---|
| *A01K 61/65* | (2017.01) | |
| *A01K 61/10* | (2017.01) | |
| *A01K 61/20* | (2017.01) | |
| *A01K 61/59* | (2017.01) | |

(Continued)

(52) U.S. Cl.
CPC ............. *A01K 61/65* (2017.01); *A01K 61/10* (2017.01); *A01K 61/20* (2017.01); *A01K 61/59* (2017.01); *B63B 22/26* (2013.01); *B63B 79/15* (2020.01)

(58) Field of Classification Search
CPC ........ A01K 61/00; A01K 61/10; A01K 61/20; A01K 61/30; A01K 61/40; A01K 61/50; A01K 61/54; A01K 61/55; A01K 61/59; B63B 22/24; B63B 22/26; B63B 2211/00; B63B 2211/02
See application file for complete search history.

(56) References Cited

U.S. PATENT DOCUMENTS

| | | |
|---|---|---|
| 2,865,618 A | 12/1958 | Abell |
| 3,210,053 A | 10/1965 | Boester |
| 3,662,890 A | 5/1972 | Grimshaw |

(Continued)

FOREIGN PATENT DOCUMENTS

| | | | |
|---|---|---|---|
| WO | 2000/003586 A2 | 1/2000 | |
| WO | WO-2016023071 A1 * | 2/2016 | ............. A01K 61/00 |

OTHER PUBLICATIONS

Lull, H.W., 1959, "Soil Compaction of Forest and Range Lands", U.S. Dept. of Agriculture, Forestry Service, Misc. Publication No. 768.

(Continued)

*Primary Examiner* — Jack W Keith
*Assistant Examiner* — Danielle A Clerkley
(74) *Attorney, Agent, or Firm* — Fargo Patent & Business Law; Thomas Kading; Joshua Krank

(57) ABSTRACT

A buoy that includes a first sensor to measure a change of an environmental event, a compartment that contains at least one organism, a second sensor to determine a maturity of the at least one organism, a release mechanism to release the at least one organism from the compartment to the body of water, an adjustable aperture nozzle mounted to the buoy to disperse the at least one organism from the compartment in (Continued)

a rate proportionate to the change of the environmental event with a quantity of the water from the body of water, and a control operable to adjust the release mechanism.

20 Claims, 6 Drawing Sheets

(51) Int. Cl.
    *B63B 22/26*     (2006.01)
    *B63B 79/15*     (2020.01)

(56) References Cited

U.S. PATENT DOCUMENTS

| | | |
|---|---|---|
| 3,778,233 A | 12/1973 | Blough et al. |
| 4,166,086 A | 8/1979 | Wright |
| 4,203,389 A | 5/1980 | Gasper, Jr. et al. |
| 4,242,199 A | 12/1980 | Kelley |
| 4,350,143 A | 9/1982 | Laing et al. |
| 4,359,014 A | 11/1982 | Molaug et al. |
| 4,412,924 A | 11/1983 | Feather |
| 4,732,682 A | 3/1988 | Rymal |
| 4,852,519 A | 8/1989 | Karlsen |
| 4,906,350 A | 3/1990 | Lucien et al. |
| 5,184,559 A | 2/1993 | Swanson |
| 5,194,144 A | 3/1993 | Blough |
| 5,217,581 A | 6/1993 | Ewing |
| 5,221,312 A | 6/1993 | Buhidar |
| 5,348,622 A | 9/1994 | Deutsch et al. |
| 6,276,057 B1 | 8/2001 | Aihara et al. |
| 6,676,837 B2 | 1/2004 | Keeton, Jr. |
| 6,997,642 B2 | 2/2006 | Bishop, Jr. |
| 7,490,565 B2 | 2/2009 | Holly |
| 7,736,509 B2 | 6/2010 | Kruse |
| 7,749,386 B2 | 7/2010 | Voutchkov |
| 7,832,959 B1 | 11/2010 | Groen et al. |
| 8,277,627 B2 | 10/2012 | Ganzi et al. |
| 8,336,467 B2 | 12/2012 | Schaffert |
| 8,343,548 B2 | 1/2013 | Kusaki et al. |
| 8,529,764 B2 | 9/2013 | Keeton |
| 8,576,668 B2 | 11/2013 | Rhodes et al. |
| 8,585,882 B2 | 11/2013 | Freydina et al. |
| 8,682,493 B1 | 3/2014 | Campbell et al. |
| 8,682,494 B1 | 3/2014 | Magro et al. |
| 8,751,052 B1 | 6/2014 | Campbell et al. |
| 8,752,771 B2 | 6/2014 | Warren et al. |
| 8,763,856 B2 | 7/2014 | Livingston et al. |
| 8,771,477 B2 | 7/2014 | Thiers |
| 8,795,510 B2 | 8/2014 | Porat |
| 8,853,872 B2 | 10/2014 | Clidaras et al. |
| 8,857,798 B1 | 10/2014 | Sparrow et al. |
| 8,887,654 B2 | 11/2014 | Hoefler |
| 8,915,453 B1 | 12/2014 | Sherry |
| 8,924,027 B2 | 12/2014 | Fadell et al. |
| 8,924,031 B1 | 12/2014 | Evett et al. |
| 8,955,445 B2 | 2/2015 | Riffel |
| 8,986,628 B2 | 3/2015 | Stone et al. |
| 8,993,679 B2 | 3/2015 | Imoto et al. |
| 2001/0040125 A1 | 11/2001 | Wada et al. |
| 2005/0167858 A1 | 8/2005 | Jones et al. |
| 2008/0115715 A1 | 5/2008 | Del Tosto et al. |
| 2009/0223508 A1 | 9/2009 | Hinderling |
| 2009/0272689 A1 | 11/2009 | Ladouceur |
| 2010/0236137 A1* | 9/2010 | Wu .................. C11C 3/003 |
| | | 554/8 |
| 2012/0006277 A1 | 1/2012 | Troy et al. |
| 2012/0230145 A1 | 9/2012 | Ladouceur |
| 2015/0056672 A1* | 2/2015 | Wu .................. C12P 7/6434 |
| | | 554/224 |

OTHER PUBLICATIONS

De'ath, Glen et al, 2012, "The 27-Year Decline of Coral Cover on the Great Barrier Reef and Its Causes," published online (PNAS Online) for National Academy of Sciences.

Whier, John, 2001, "Mapping the Decline of Coral Reefs" in the NASA publication Earth Observatory.

Nolin, Robert, 2013, "South Florida Coral Reefs In 'Extremely Alarming' Decline" in Sun Sentinel.

Putnam, Hollie M.; Edmunds, Peter, 2011, "The physiological response of reef corals to diel fluctuations in seawater temperature" published in the Journal of Experimental Marine Biology and Ecology, vol. 396, Issue 2, pp. 216-223.

Mayfield, Anderson B. et al, 2012, "The effects of a variable temperature regime on the physiology of the reef-building coral *Seriatopora hystrix*: results from a laboratory-based reciprocal transplant". in The Journal of Experimental Biology.

Wenner, E. et al., "Characterization of the Ashepoo-Combahee-Edisto (ACE) Basin, South Carolina," published online (www.nerrs.noaa.gov/Doc/SiteProfile/ACEBasin/intro.htm) by SCHNR Marine Resources Research Institute.

Johnson, Zackary I. et al., 2013, "Dramatic Variability of the Carbonate System at a Temperate Coastal Ocean Site (Beaufort, North Carolina) is Regulated by Physical and Biogeochemical Processes on Multiple Timescales", PLOS ONE.

Dev, Soumyabrata; Savoy, Florian M.; Lee, Yee Hui; Winkler, Stefan; 2014, "Wahrsis: A Low-cost, High-Resolution Whole Sky Imager with Near-Infrared Capabilities", Singapore 639798, Advanced Digital Sciences Center (ADSC), University of Illinois at Urbana-Campaign, Singapore 138632.

Bouet, Remy; Dec. 20, 2005, "Ammonia: Large-scale atmospheric dispersion tests" translation of French report "Ammoniac: Essais de dispersion d'ammoniac a grande echelle—INERIS-DRA-RBo-1999-20410. R. Bouet", Ineris—Accident Risks Division, Work Study N 10072.

Fitt, W.K. and Warner, M.E., 1995, "Bleaching patterns of four species of Caribbean reef corals", Biol. Bull. 189, 298-307.

Gates, R.D., 1990, "Seawater temperature and sublethal coral bleaching in Jamaica", Coral Reefs 8, 193-197.

Hoegh-Guldberg, O. and Jones, R.J., 1999, "Photoinhibition and photoprotection in symbiotic dinoflagellates from reef-building corals", Mar. Ecol. Prog. Ser. 183, 73-86.

Hoegh-Guldberg, O. and Smith, G.J., 1989, "The effect of sudden changes in temperature, light and salinity on the population density and export of zooxanthellae from the reef corals *Stylophora pistillata* Esper and *Seriatopora hystrix* Dana", J. Exp. Mar. Biol. Ecol. 129, 279-303.

Leichter, J.J., Helmuch, B., Fisher, A.M. 2006, "Variation beneath the surface: quantifying complex thermal environments on coral reefs in the Caribbean, Bahamas and Florida", J. Mar. Res. 64, 563-588.

Moore, Kenneth A.; Jarvis, Jessie C.; 2008, "Environmental Factors Affecting Recent Summertime Eelgrass Diebacks in the Lower Chesapeake Bay: Implications for Long-term Persistence, Journal of Coastal Research" (Special Issue 55: pp. 135-147 posted online http://www.jcronline.org/doi/abs/10.2112/SI55-014.

Stevenson, J. Court; Piper, Catherine B.; and Confer, Nedra; 1979, "Decline of Submerged Plants in Chesapeake Bay".

Pickerell et al. Buoy-deployed seeding: Demonstration of a new eelgrass (*Zostera marina* L.) planting method. Ecological Engineering 25 (2005) 127-136. Jan. 28, 2005. <URL:http://depts.washington.edu/seagrass/wordpress/wp-content/uploads/2010/Buoy%20deployed%20seeding.pdf>.

International Search Report for PCT/US2016/043229 dated Sep. 29, 2016.

* cited by examiner

RESPONSIVE DISPERSION FROM COMPARTMENT IN AQUEOUS SOLUTION

The present application is a CONTINUATION application of U.S. patent application Ser. No. 15/746,115 (01632-ZIT) filed Jan. 19, 2018 which is a 371 of international patent application PCT/US/16/43229 filed Jul. 21, 2016 which claims benefit of U.S. provisional patent application 62/196,279 filed Jul. 23, 2015.

FIELD OF INVENTION

This invention relates to systems and methods to disperse material in response to an independent variable such as water temperature or current or the amount of sunlight. The system and methods can be used to manage a local environment such as a seagrass bed, a coral reef or a protected swimming area, but can also be applied to small local environments such as a swimming pool, or expanded into a network covering a coastline.

BACKGROUND

The world is experiencing more extreme weather effects. Water, air and sunlight are almost always significant factors causing extreme weather and also impacting human populations, plants and animals and the natural environment in general. While there is debate as to the priority of contributing factors, man-made or natural, there is no doubt that the contributions of various causes are cumulative: that is, an increased deviation to one causal factor will increase the likelihood and severity of weather events, and may be the critical tipping point for a catastrophic environmental change even if the relative contribution of that factor was small. Therefore it is beneficial to search all possible solutions to reduce the effects of contributing factors to this extreme weather.

The diebacks to marine grasses have been attributed to water temperature, salinity and pH, and human impacts from dredging and anchor drags, among other factors. The impact to seagrasses has been similar to that of coral reefs. Consider a 1979 report, *Decline of Submerged Plants in Chesapeake Bay* (J. Court Stevenson, Catherine B. Piper and Nedra Confer), where the authors write "*Decline of the Bay Grasses* The U.S. Fish and Wildlife Service Migratory Bird and Habitat Research Laboratory (MBHRL) and the Maryland Department of Natural Resources have monitored the occurrence of aquatic grasses in Maryland waters from 1971 to the present. These surveys constitute the main body of information on Chesapeake Bay grasses. By combining data from over 600 sampling stations in 26 areas, they found that the percent of stations with grasses decreased from about 28% at the start of the survey in 1971 to about 10% in 1978. Although no comparable survey has been conducted in Virginia, spot measurements of submerged grass beds by the Virginia Institute of Marine Science reflect a similar decline." These observations are parallel to the effects seen for coral reefs. In one study, "The 27-Year Decline of Coral Cover on the Great Barrier Reef and Its Causes," by Glen De'ath et al, the authors summarized, "Based on the world's most extensive time series data on reef condition (2,258 surveys of 214 reefs over 1985-2012) we show a major decline in coral cover from 28.0% to 13.8% (0.53% y−1), a loss of 50.7% of initial cover. Tropical cyclones, coral predation by crown-of-thorns starfish (COTS), and coral bleaching accounted for 48%, 42%, and 10% of the respective estimated losses . . . " and concluded this summary, "strategies can, however, only be successful if climatic conditions are stabilized, as losses due to bleaching and cyclones will otherwise increase." In an article "Mapping the Decline of Coral Reefs" by John Whier, the author wrote, "The latest reports state that as much as 27 percent of monitored reef formations have been lost and as much as 32 percent are at risk of being lost within the next 32 years." In another article, "South Florida Coral Reefs In 'Extremely Alarming' Decline" by Robert Nolin, the author states, "A recent report by an international group of scientists concluded that coral reef growth, especially reefs in shallow water like that offshore South Florida, has declined by as much as 70 percent." Whatever a scientist may label this as the impact of climate change, global warming, or natural changes to water temperature, oxygen, pH and salinity, the damage to seagrasses and coral is readily apparent.

A more recent 2008 posting online restated the trend and the causes. Kenneth A. Moore and Jessie C. Jarvis (2008) cite, "We investigated the effects of several environmental factors on eelgrass abundance before, during, and after widespread eelgrass diebacks during the unusually hot summer of 2005 in the Chesapeake Bay National Estuarine Research Reserve in Virginia . . . . Results indicate nearly complete eelgrass vegetative dieback during the July-August period of 2005, in contrast to the more seasonal and typical declines in the summer of 2004 . . . . In 2005, the frequency and duration of water temperatures exceeding 30° C. were significantly greater than that of 2004 and 2006. Additionally, the frequencies of low dissolved oxygen excursions of 1-3 mg $L^{-1}$ during this period were greater in 2005 than 2004 or 2006. These results suggest that eelgrass populations in this estuary are growing near their physiological tolerances. Therefore, the combined effects of short-term exposures to very high summer temperatures, compounded by reduced oxygen and light conditions, may lead to long-term declines of this species from this system." Considering the interdependence of life on earth to salt water coral formations, this erosion has been put forth by scientists as a crisis for our future existence and health.

The interaction, balance and transformation of the ecosystem for marine grasses or a coral reef is complex, and the scientific study even of individual factors such as sunlight is rather recent, due in part to the difficulty of measuring aspects in a sub-sea region. The term "sun bleaching" is generalized to explain the white color of a dying reef formation, which is likely caused by several factors of temperature, pH, and others listed, and not singularly parallel to what is termed sunburn. But the effects of direct sunshine on temperature for an ocean reef have been proven. In "The physiological response of reef corals to diel fluctuations in seawater temperature" published by Hollie M. Putnam and Peter J. Edmunds, the authors summarize in the abstract, "the effects of fluctuating temperatures on tropical scleractinian corals arose when diurnal warming (as large as 4.7° C.) was detected over the rich coral communities found within the back reef of Moorea, French Polynesia. The authors explain in the article (p. 217) that "underwater temperature fluctuates rapidly (i.e., up to ~5° C. in <24 h) throughout the Florida Keys, the Bahamas, St. Croix, Belize, and Bonaire (Leichter et al, 2006), largely as a result of diurnal warming in shallow water (10 m), and tidal forcing and internal waves at greater depths (20-30 m)." In another study, "The effects of a variable temperature regime on the physiology of the reef-building coral *Seriatopora hystrix*: results from a laboratory-based reciprocal transplant" published by Anderson B. Mayfield et al., the authors summarize, "To understand the effects of global climate change on reef-building corals, a thorough investigation of their physiological mechanisms of acclimatization is warranted. However, static temperature manipulations may underestimate the thermal complexity of the reefs in which many corals live. For instance, corals of Houbihu, Taiwan, experience changes in temperature of up to 10° C. over the course of a day during spring-tide upwelling events." In a third study, "Characterization of the ASHEPOO-COMBAHEE-EDISTO (ΔCE) Basin, South Carolina," published by E. Wenner et al., the authors explain, "Diurnal variation in temperature was evident with warmest temperatures occurring during the time interval of 1300-1800 hrs for each month at both sites." In yet a fourth study, "Dramatic Variability of the Carbonate System at a Temperate Coastal Ocean Site (Beaufort, North Carolina) is Regulated by Physical and Biogeochemical Processes on Multiple Timescales," by Zackary I. Johnson et al., the authors noted "short-term spikes in the acidity of the estuary were driven by changes in temperature, water flow, biological activity and other natural factors . . . ."

Other trends include an increasing demand from the multiplying human population for fresh water, movement of water and purification of water, all simultaneous with a depletion of water stores from key regions and unpredictable climate impact to water conditions. Consider for the U.S.A. that California is mandating water rationing and regulations that impact the farmer and homeowner, but must be balanced to every business entity such as a golf course or manufacturing facility. The ability to provide water where it is needed, even if from a water source that would be considered remote or inaccessible prior to this invention, or to mitigate the growing drought conditions can have enormous benefit.

DESCRIPTION OF PRIOR ART

Many methods exist to disperse fluids or solids, such as sprinklers, ink jets, farm seeders and medical devices. Farming devices typically seek to deliver a prescribed quantity or moisture level through direct supply of water. For example, Campbell et al.'s U.S. Pat. No. 8,751,052 discloses a method to monitor soil moisture to set a threshold for irrigation, and would direct standard methods of flow irrigation. Campbell et al.'s U.S. Pat. No. 8,682,493 describes a plurality of profiles of moisture levels, salinity and temperature but would link these to common irrigation systems. As another example, Magro et al.'s U.S. Pat. No. 8,682,494 discloses methods to measure soil conditions such as salinity, temperature or moisture to prescribe direct action, and relies on common irrigation methods for that action.

Other devices attempt particular dispersion patterns or to distribute particular substances for size or chemical properties. For example, Swanson's U.S. Pat. No. 5,184,559 describes a device to distribute seed evenly using a meter and a specially designed plate. Another example is Aihara et al.'s U.S. Pat. No. 6,276,057 B1, which discloses a nozzle with two orifices to prevent ink from clogging the print head. Holly's U.S. Pat. No. 7,490,565 B2 describes a meter and drum to deliver seeds at a set rate. Schaffert's U.S. Pat. No. 8,336,467 B2 describes an extension for depositing both seed and liquid into a furrow. Kusaki et al.'s U.S. Pat. No. 8,343,548 B2 describes a chemical of a certain size to facilitate dosage of a poorly soluble solid. Livingston et al.'s U.S. Pat. No. 8,763,856 B2 describes introducing water to a measuring chamber to distribute powdered or liquid chemical to a washer. Riffel's U.S. Pat. No. 8,955,445 B2 describes an air intake system to distribute seeds at regular intervals. Stone et al.'s U.S. Pat. No. 8,986,628 B2 describes a device to form discontinuous sections together in a fluid. Imoto et al.'s U.S. Pat. No. 8,993,679 B2 describes aqueous dispersion of fluorine-containing seed polymers by creating a coating film.

One drawback is that such systems are designed effectively as an on/off switch, a timed delay function or a variable speed that provides partial dispersion. Control systems may measure the amount of fluid, seeds or solid dispersed and adjust valves based on pressure or other internal controls. None of these systems has as an object to adjust the dispersion of material based on at least one independent variable such as external environmental factor.

Porat's U.S. Pat. No. 8,795,510 B2 describes an automated pool cleaner that uses an external probe for chlorine, then dispersing chlorine by generating an electrochemical reaction from sodium chloride in the device, or from the water outside the unit. The device is dedicated to chlorine, and does not provide a compartment where different materials could be inserted, nor does it permit a choice of materials to insert. Furthermore, the test for the environmental factor of chlorine is not truly independent because it will be influenced by the material dispersed. While it is likely that this is a real operational limit of the Porat prior art, where the device would be stopping and starting as chlorine is dispersed and then measured at higher set points, the distinctive aspect is that the variable used as a basis for dispersion is the same as the material dispersed, therefore the variable is not independent.

An independent variable is a factor, condition, object, action, event or change that exists or acts separately from the proposed device, model or method. In a statistical or mathematical model, we measure the group of "other" variables that are dependent or affected by the independent variable. If we set up a matched control group where the independent variable is held steady while our test group changes the independent variable, or if we measure the group of dependent variables before and after a state change for the independent variable, this can measure the accuracy and effectiveness of a model. For this invention, the independent variable is as a factor, condition, object, action, event or change that occurs or acts separately from the apparatus and separately from the gas, fluid or solid to be dispersed. When dispersing water, the external water vapor pressure is an independent variable that affects whether a droplet size will create fog or mist or drizzle. By measuring water vapor pressure and adjusting nozzle aperture the apparatus can consistently deliver the droplet size for the desired state of fog or mist or drizzle desired. The benefits for water dispersion include visual effects, shading, and transfer of fluid to specific areas. A corresponding benefit may result for other materials such as gasoline or paint or food paste. Other instruments can be layered into the device, such as heating elements to heat the fluid. In alternate embodiments, the measurement of remote variables can be processed by a central computer and direction provided as a composite signal to a group of nozzle apertures that achieve an overall strategy. The list of aspects provided for fluid dispersion are examples and not limiting. Water vapor pressure is also an example of an independent variable that may affect the fluid, dispersion and dependent variables, and therefore possible benefits, but water vapor pressure is not a limiting example. When dispersing seeds underwater, current is an independent variable that may indicate optimum propagation times.

One independent variable that may affect seagrass propagation is the depth of water to the sea bed. Another independent variable may be length of day that indicates season.

Another independent variable may be wind or current or rain, where stormy conditions could indicate the seeds would scatter outside of an ideal depth. Other variables may be pH, salinity, oxygen level or turbidity (as a proxy for fertilizer runoff), for which different species may have different favorable characteristics. To contain several species of seeds and determine which species is dispersed, or to change the rate of dispersion based on these independent variables, all can optimize the likelihood that seeds will propagate and successfully cultivate a bed of sea grass.

The same mechanism could be applied to hatchlings of small fish if the object is to repopulate an area with native or beneficial species. The same mechanism could provide a safety device to protect the habitat for grasses, fish or people, by distributing a liquid or solid that repels predators. The same mechanism could serve to warn people, by distributing a liquid or solid that is readily apparent to people when a predator approaches. It is possible to use a sensor or computer aided analysis of sensors that identifies specifically an organism of particular color, size, speed or species.

None of the prior art provides an apparatus that responds to environmental sensors with a proportionate dispersion from a compartment. None of the systems adjust the aperture of a nozzle together with the fluid pressure in response to independent variables, such as environmental stimuli, to disperse liquid or solid or gas. None of the existing systems seek to optimize the seed propagation for marine vegetation. None of the systems work together with natural forces such as current and wind to disperse liquids or solids into an aqueous solution.

SUMMARY

An apparatus according to one disclosed non-limiting embodiment of the present disclosure includes a buoy that floats in a body of water; a first sensor to measure a change of an environmental event external to the apparatus; a compartment in the buoy that contains at least one organism; a second sensor to determine a maturity of the at least one organism; a release mechanism to release the at least one organism from the compartment to the body of water external to the apparatus; an adjustable aperture nozzle mounted to the buoy and connected to the release mechanism, the adjustable aperture nozzle adjustable through a range of sizes to disperse the at least one organism from the compartment in a rate proportionate to the change of the environmental event as measured by the first sensor to the body of water external to the apparatus, with a quantity of the water from the body of water; and a control in communication with the first sensor, the release mechanism, the second sensor, and the adjustable aperture nozzle, the control operable to adjust the release mechanism, and the adjustable aperture nozzle to control dispersion of the at least one organism with the quantity of the water from the body of water in proportion to the change of the environmental event as measured by the first sensor, the controller operable to activate the release mechanism to release the at least one organism when the measurement from the second sensor is determined to reach a set point.

A further embodiment of any of the foregoing embodiments of the present disclosure includes that the at least one organism is composed of at least one of: fish, crustaceans, or plankton.

A further embodiment of any of the foregoing embodiments of the present disclosure includes that the second sensor is operable to sense at least one of a size, a color, a density, a speed or a proxy of the maturity of the at least one organism.

A further embodiment of any of the foregoing embodiments of the present disclosure includes that the environmental event is at least one of temperature, pH, oxygen level, carbon dioxide level, wind, tide, water current, wave or sunlight.

A further embodiment of any of the foregoing embodiments of the present disclosure includes that the adjustable aperture nozzle is adjusted by at least one of opening, closing, turning, rotating, spinning, extending or retracting in addition to adjusting a size of the aperture of the adjustable aperture nozzle in proportion to the environmental event.

A further embodiment of any of the foregoing embodiments of the present disclosure includes that the first sensor is displaced from the apparatus.

A further embodiment of any of the foregoing embodiments of the present disclosure includes, where at least one activity of the apparatus is logged to a data file.

A further embodiment of any of the foregoing embodiments of the present disclosure includes, where the control further adjusts based on a predictive model formed from at least one of an activity of the apparatus, the environmental event or historical data.

An apparatus according to one disclosed non-limiting embodiment of the present disclosure includes a buoy that floats in a body of water; a first sensor to measure a change of an environmental event external to the apparatus; a compartment in the buoy that contains at least one organism, and a second sensor; a release mechanism to release the at least one organism from the compartment to the body of water external to the apparatus; an adjustable aperture nozzle mounted to the buoy and connected to the release mechanism, the adjustable aperture nozzle adjustable through a range of sizes to disperse a quantity of the at least one organism from the compartment in a rate proportionate to the change of the environmental event as measured by the first sensor, to the body of water external to the apparatus, with a quantity of the water from the body of water; and a control in communication with the first sensor, the release mechanism, the second sensor, and the adjustable aperture nozzle, the control operable to adjust the release mechanism and to adjust the adjustable aperture nozzle to control the dispersion of the quantity of the at least one organism with the quantity of the water from the body of water in proportion to the change of the environmental event as measured by the first sensor, the controller operable to adjust the nozzle aperture and the release mechanism to release the at least one organism based in response to the measurement from the second sensor.

A further embodiment of any of the foregoing embodiments of the present disclosure includes that the at least one organism is composed of at least one of: fish, crustaceans, or plankton.

A further embodiment of any of the foregoing embodiments of the present disclosure includes that the activity of the apparatus comprises a prior strategy employed.

A further embodiment of any of the foregoing embodiments of the present disclosure includes a pump in the buoy operable to produce a flow of water from the body of water into which the at least one organism released from the compartment is mixed and then pumped through the adjustable aperture nozzle to the body of water external to the apparatus.

An apparatus according to one disclosed non-limiting embodiment of the present disclosure includes a buoy that floats in a body of water; a receiver to receive measurements from a remote station to determine a change of an environmental event; a compartment in the buoy that contains at least one organism, the compartment contains a sensor that determines at least one of a size, a color, a density, a speed or a proxy for a maturity of the at least one organism; a release mechanism to release the at least one organism from the compartment to the body of water external to the apparatus; an adjustable aperture nozzle mounted to the buoy and connected to the release mechanism, the adjustable aperture nozzle mechanism adjustable through a range of sizes to disperse a quantity of the at least one organism from the compartment to the body of water external to the apparatus, with a quantity of the water from the body of water; and a control in communication with the receiver, the release mechanism, the sensor, and the adjustable aperture nozzle, the control operable to adjust both the release mechanism and the adjustable aperture nozzle to disperse the quantity of at least one organism with the quantity of the water from the body of water in proportion to the change of the environmental event as measured by the receiver and the measurement from the sensor in the compartment.

A further embodiment of any of the foregoing embodiments of the present disclosure includes a liquid or solid that is mixed with the organism to be dispersed.

A further embodiment of any of the foregoing embodiments of the present disclosure includes that the adjustable aperture nozzle is adjusted to create a pre-set pressure determined to optimize the dispersion of the at least one organism.

An apparatus according to one disclosed non-limiting embodiment of the present disclosure includes a buoy that floats in a body of water; a first sensor to measure a change of an environmental event external to the buoy; a compartment in the buoy that contains at least one organism, the compartment contains a second sensor that determines their size, color, density, speed or a proxy for their maturity; a release mechanism to release the at least one organism from the compartment; an adjustable aperture nozzle mounted to the buoy and connected to the release mechanism, the adjustable aperture nozzle adjustable through a range of sizes to disperse a quantity of the at least one organism from the compartment with a quantity of the water from the body of water; and a control in communication with the first sensor, the second sensor, the release mechanism, and the adjustable aperture nozzle, the control operable to adjust the release mechanism, and to adjust the adjustable aperture nozzle to control the dispersion of the at least one organism with the quantity of the water from the body of water in proportion to the change of the environmental event and to a desired maturity of the at least one organism.

A further embodiment of any of the foregoing embodiments of the present disclosure includes that the release mechanism is at least one of a propeller, a paddle, an impeller, a bellows, a pressure mechanism, a coil or a screw.

A further embodiment of any of the foregoing embodiments of the present disclosure includes that a multiple of buoy apparatus, each of the multiple buoy apparatus operating as defined above, communicate data to a central station, the central station analyzing at least one of the data from the buoy, the data from one or more remote sensors, or historical data, the central station further determining a strategy for dispersion from the one or more apparatus based on the analysis and the central station communicating the strategy by directing the one or more apparatus how and when to disperse.

A further embodiment of any of the foregoing embodiments of the present disclosure includes that the apparatus is further programmed in the event that no communication is received from a central station that the apparatus determines to disperse according to its previous pattern or to disperse according to a strategy the buoy projects it would receive from the central station.

A further embodiment of any of the foregoing embodiments of the present disclosure includes a multiple of buoy apparatus, each of the multiple buoy apparatus operating as defined above.

The foregoing features and elements may be combined in various combinations without exclusivity, unless expressly indicated otherwise. These features and elements as well as the operation thereof will become more apparent in light of the following description and the accompanying drawings. It should be appreciated that however the following description and drawings are intended to be exemplary in nature and non-limiting.

DETAILED DESCRIPTION

Figures 1A, 1B:
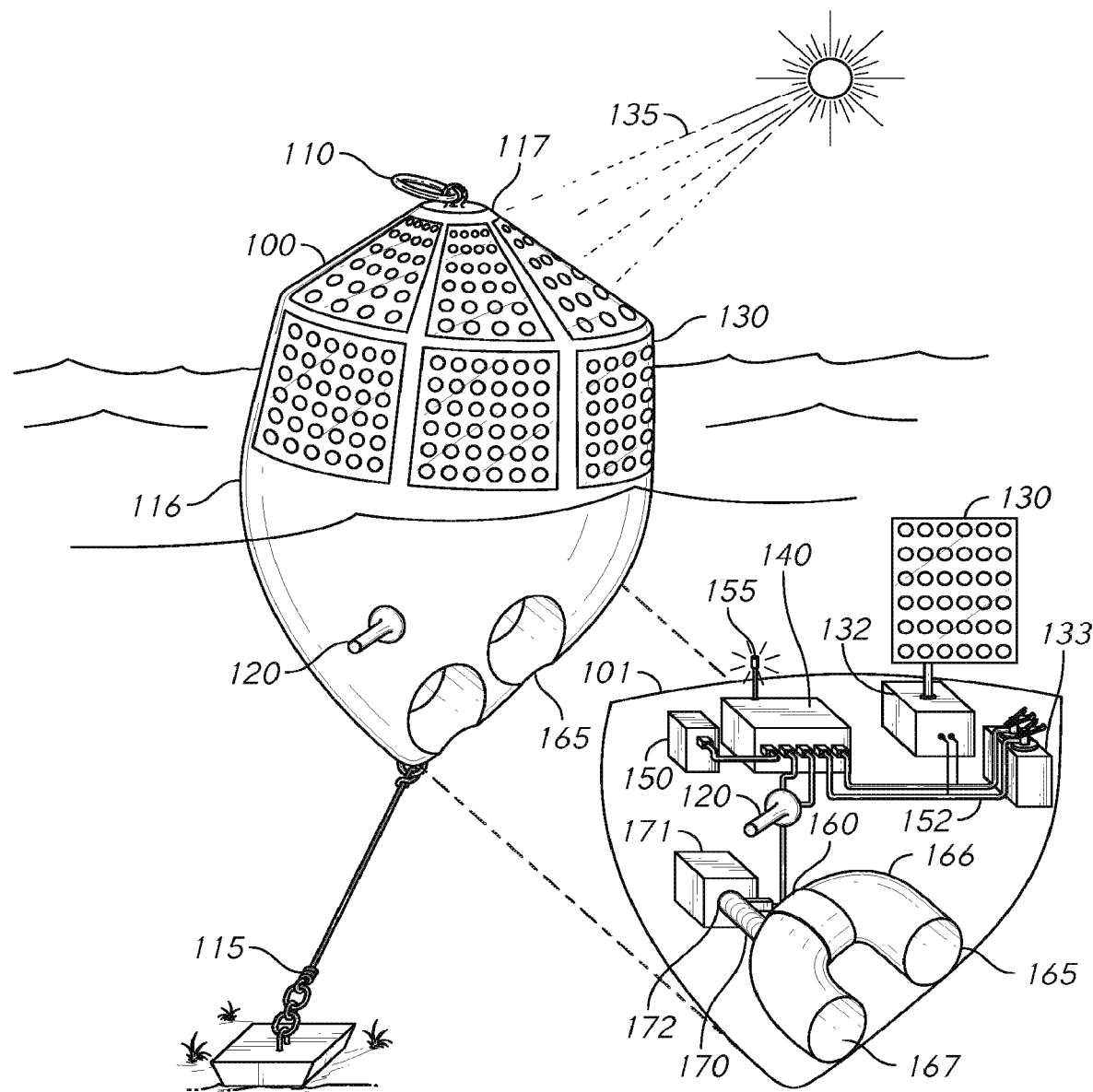
FIG. 1A-1B shows a schematic depiction of an embodiment of the dispersion apparatus with a compartment for solids to disperse into an aqueous solution responsive to an environmental factor.

FIG. 1 shows a schematic depiction of an embodiment of the dispersion apparatus [100] for controlled dispersion responsive to an independent variable, with cross-section of internal components [101] in FIG. 1b. The apparatus [100] is a self-contained buoy with retrieval ring for boats [110], similar to buoys used to tether crab or lobster pots. The buoy is tied by rope and anchor chain [115] to a fixed ring and weight embedded in the ocean floor, and by way of this tether the buoy will be fixed to this location and will remain generally in its intended upright position with the heavier balanced portion [116] below the waterline, regardless of wave and wake action. Despite the weight of the tether, the apparatus unit floats. Within the external housing of the buoy, below the waterline, is a sensor [120] that measures an independent variable, in this instance reading the external environmental factor of water temperature. An example of a common water temperature gauge would be model WD-93823-00 sold by Novatech International, produced by Oakton. The upper part of the external housing [117], above the waterline, is a clear, durable plastic, which permits sunlight [135] to enter and be absorbed by solar panel collectors [130]. The plastic housing is durable to withstand accidental impact from boats or other objects. Described in FIG. 1b, the exploded, cross-section view of internal components [101], the solar panels [130] are connected to power generating equipment [132] and to a battery [133] that will store power generated. The power generating equipment [132] provides power for a central processor [140] that powers the devices such as the sensor [120] and computer data storage device [150], for communications equipment [155], for a water pump [160], and for a coil screw [170] that adjusts mixture from the compartment [171] to the channel where water is pumped. In this embodiment, there is a rubber seal [172] around the coil screw [170] that keeps the area within the compartment [171] dry, at a differential moisture or in general as a controlled environment suitable to store the material prior to mixing with the sea water to be dispersed. The buoy has an opening [165] in the bottom that is an intake to a water pump [160] and is not open to the interior cavity of the buoy that contains solar panels [130], processor [140], data storage [150], communications equipment [155], device wiring [152] and power unit [132] and compartment [171]. The sensor [120] for water temperature collects readings every 15 seconds and the data is processed by processor [140] and stored in the data storage device [150]. The solar panels [130] collect solar energy and the power unit [132] converts this to energy to maintain the battery [133] at full charge and to power the processor, which in turn powers the other devices such as the sensor [120]. When the water temperature reaches a minimum level, then a signal is sent to the processor, which activates the coil screw [170] and the pump [160] to start pumping. It is possible to use other sensors to measure pH, salinity, current or other independent variables and act as a trigger. When the pump [160] operates, it sucks sea water through the opening [165] in the bottom of the buoy and trajects it in a center channel [166] out through the opening [167] of the buoy into the water. The apparatus may have a screen of fine mesh over the openings [165] [167] to protect the pump [160] from objects and to protect organisms from being sucked into the opening [165]. The apparatus may also use any variety of tripper rods near the opening [165] that interrupt the pump and delay its restart when such a rod is pushed or squeezed, to act as a safety mechanism from people or creatures near the pump [160]. Such a safety scheme could also be used on the outer rim of the buoy apparatus [100] at the waterline where a swimmer in distress could approach the buoy [100] and the buoy would shut off. The sensor [120] of the apparatus [100] continues to read and record water temperature every 15 seconds. While the water temperature remains above a set point, the coil screw [170] and the pump [160] continue to operate. As the water temperature lowers, the coil screw [170] and the pump [160] are accelerated to disperse more seeds. When the water temperature rises above a set point, then the coil screw [170] and the pump [160] will deactivate. The set points to deactivate the coil screw [170] and the pump [160] may be above the initial activation points for water temperature.

In an alternate embodiment, the unit [100] is also in communication with a remote sensor to measure water temperature at another location of the reef or sea bed, such sensors using wireless communications. In this embodiment, the unit may be directed by the processing of the temperature readings at the buoy [110] and at the reef to adjust dispersion. There are a variety of methods to take readings and analyze results, including the differential gain in temperature at two different points or historically at two different points when a unit [100] is activated compared to when a unit [100] is not activated, and the example given here is not limiting of how such sensors may be deployed.

In an alternate embodiment, the unit [100] also includes a current direction and speed indicator, like a wind vane integrated with an anemometer, to determine if the unit [100] is activated, so that seeds will be dispersed when the current is expected to carry seeds over a target shallow region, and the unit [100] will not be activated if current is flowing in an alternate direction. It is possible to use depth gauges or GPS tracking or other location devices to determine the position or proximity of the unit [100] in addition to current direction and speed, and in combination with sensors for water temperature, pH, salinity and oxygen in order to disperse seeds at the most favorable conditions and location. It is possible that several such units [100] deployed in the same region but operating independently will result in dispersion by units [100] with a favorable position and current direction but a dormant state of units [100] with an unfavorable position or current direction.

In an alternate embodiment, the processor, data storage and sensors of the unit compare current readings and trend of readings for the most recent two week period with historical patterns of weekly periods or similar calendar weeks from previous years, to determine a probability that the sunlight and water temperature will proceed to a prolonged deactivation, what may commonly be referred to as a prediction of prolonged fatal temperature. For such a prediction model, the unit may be programmed to activate the dispersion at a higher rate prior to the predicted fatal temperature so as to optimize survival and benefit of the seeding. In such an embodiment, it may be efficient to use battery power to operate the pump over a time period that power is draining from the battery faster than the solar panels are able to charge the battery, due to the current lower amount of sunlight.

The unit may utilize a pump, propeller, paddle, impeller, boiler, heating element, compression valve, bellows or pressure mechanism to achieve the release from the compartment and to achieve the trajectory, force, duration or pattern of the dispersion of the material. The preferred embodiment uses a pump with rotating plastic impeller in a chamber to create water pressure in a chamber where the water can exit through a small aperture in the side. The result of this pressurized seawater through the small aperture is to traject the mixture of seeds and water in a favorable direction. Alternate embodiments may employ more powerful pumps to disperse seeds in a broader pattern or to attempt to place seeds to a location where the seeds would not land by the force of gravity or current alone.

An alternate embodiment may cool or heat the seawater or seeds to be dispersed. The ability to integrate or combine cooling or heating elements is not assessed here for the overall impact on the marine environment. There may be a wide array of technologies that differentially transfer heat from the water into the air, or transfer heat from an extreme part of the day to a less extreme period. A heating element, which is a typical feature added to some humidity dispersion devices, serves as an example for this embodiment of adding and integrating features. There are a variety of heating elements, boilers, compression valves and compression vacuum methods that could be employed to heat the seawater. Such heated water may rise within a larger body of water and thereby carry seeds or material inclusions farther.

In an alternate embodiment, the buoy includes the apparatus of Zito et al.'s U.S. Patent application 62/104,850 and U.S. Patent application 62/104,850. Zito et al.'s U.S. Patent application 62/104,850 and U.S. Patent application 62/106, 199 are specifically incorporated herein by reference for all that they disclose and teach. The processor of this alternate embodiment uses computer code to interpret sensor data and historical patterns to determine optimal nozzle aperture to integrate with other dispersion features to disperse water into the air. In this alternate embodiment, the buoy apparatus is dispersing seeds into the sea and also dispersing water into the air, either simultaneously, alternately or independently. The processor may optimize dispersion of the seeds and the water relative to the power production and consumption. This embodiment may alternatively be designed to introduce the seeds into the channel for pumping water into the air, so as to traject the seeds farther or in a specific direction, such as toward shallow water. This embodiment may alternatively use the processor to determine when to mix the seeds into the channel for sea water circulated beneath the water surface, or to mix the seeds into the channel for sea water pumped into the air. One design is to have two coil screws from the compartment, where one coil screw is connected to the channel that circulates water beneath the surface and the other coil screw is connected to the channel that pumps water into the air, and either or both coil screws can operate at a time. Another design could use a diverter in combination with the coil screw to determine which channel receives seeds for mixture. Another design could use a diverter with one inlet channel for water, to select one outlet channel or both to pump or circulate water, and to introduce seeds to the inlet channel or outlet channels for mixture and dispersion.

In an alternate embodiment, the apparatus includes communication equipment to send or receive signals to boats, stations, and other units or controllers. The processor may receive a signal from a central station to override the control and activate the pump. The processor may receive a signal from an approaching boat to override the control and deactivate the pump. An alternate embodiment may include a separate compartment with a dye pack or other marker that is mixed with the seeds to be dispersed, so that the path and location of the dispersion can be seen or recorded. The embodiment may include visual and auditory signaling equipment, such as a whistle or lights, to alert a manager that seeds are being dispersed.

Figure 2:
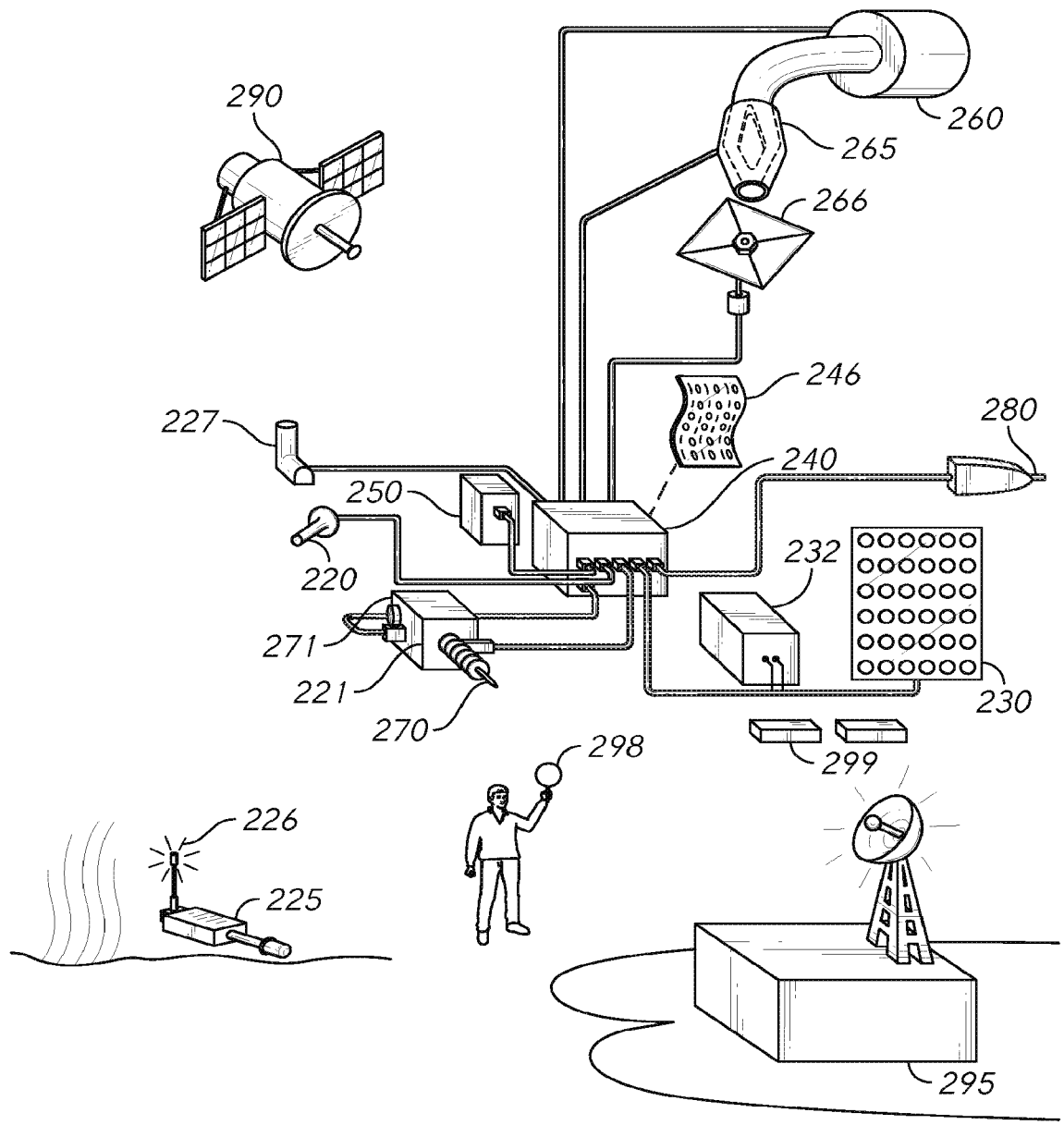
FIG. 2 shows an isolated depiction of the sensors, processing and control loop for water temperature, pH, salinity and oxygen and automatic adjustment of the pump nozzle, and shows a depiction of the solar panels, power converter and battery.

FIG. 2 shows an isolated depiction of the sensors, processing and control loop for a pH meter [280], water temperature gauge [220], remote temperature gauge [225] and automatic adjustment of the coil screw [270], and shows a depiction of a solar panel [230] and power converter [232]. A wide variety of pH meters and temperature gauges are available. There are a variety of communication methods available for sensors, including direct line and wireless transmitter and receiver. In this example, the remote sensor [225] has been placed to provide a relatively unobstructed path for wireless communication, and the transmitter [226] uses a short range radio wave that is capable to reach the receiver [227] in the buoy apparatus. The remote sensor [225] measures and sends data at regular 15 second intervals.

The data is processed by the processor [240] using computer code [246] together with data from the data storage device [250] that includes prior measurements, historical data and predictive models. It is possible to include one or more of a variety of additional gauges to measure salinity and oxygen level and to send this data to the processor [240]. When measurements of the current conditions of water temperature, pH, salinity and oxygen level reach set points determined as fixed set points and adjusted by predictive models, the processor [240] then sends a signal to the coil screw [270] and the pump [260] to activate. The processor creates a composite score for the measurements and adjusted set point based on historical patterns and predictive model. This composite score is recorded in the data storage unit with date and time and a log of the pump activity and coil screw. Another gauge [221] in the compartment is measuring the quantity loaded or the quantity remaining of the material to be dispersed, and this measurement is sent to the processor to be integrated with the composite score. The measured quantity loaded or remaining could be a weight, volume or count of items or solids in the compartment or container. The composite score is also used to adjust the rate of the coil screw [270] and the pump [260]. As subsequent measurements are received, processed and interpreted with the historical data and predictive model into an adjusted composite score, the coil screw [270] and the pump [260] are accelerated to deliver more volume dispersed, or decelerated and as a result less volume dispersed. In this example, the nozzle aperture [265] is adjusted to affect the volume of water dispersed and to control the seeds dispersed. A rotating plate [266] is beneath the outlet will further assist the dispersion of the seeds. As the speed of rotation for the plate [266] is increased, the seeds will disperse in a wider pattern. It is possible to adjust the nozzle aperture, the rotating plate and the pump speed for water pressure all together to optimize the pattern of the mixture dispersed.

Weather satellite [290] measurements can be sent in a signal received by the apparatus receiver [227] and included in the compilation of data and predictive model for interpretation and determination of the composite score used to activate and adjust the coil screw, pump and nozzle. The apparatus may use the advantage of local, low altitude and less expensive measurements directly from apparatus sensors together with data received from high altitude and expensive measurements such as satellite-based spectroscopy, to deliver a more robust weather analysis, predictive model and resulting dispersion. The results and collective log are sent by signal from the apparatus to a central land station [295] where the information assists to understand and predict weather patterns. The data could just as easily be sent to any number of external entities such as satellites, air or sea craft. A manager at the central land station [295] reviews more regional weather data and based on this broader perspective sends a signal to the apparatus receiver [227], interpreted by the processor [240], and the processor overrides the current programmed direction to send a signal to adjust the coil screw [270], the pump [260] and nozzle [265] for a prescribed period of time.

An approaching person has an RFID tag [298] on a controller, which sends a signal to the buoy receiver [227] and the processor interprets the signal using computer code. The person's controller could just as easily transmit a special code or use any variety of signal systems to be received by the apparatus. Based on the processor interpretation of the signal, the processor sends a signal to the coil screw [270] and the pump [260] to deactivate until given another signal to reactivate. While deactivated, the person is able to secure the buoy apparatus to manage its operation, place materials into the compartment, download date or otherwise observe and maintain its condition. The processor [240] sends data to the data storage [250] that includes the identification number of the person's RFID tag or controller, the initial time of the visit, the activity of the coil screw [270] and the pump [260] as they are deactivated, and the terminal time of the visit and the reactivation of the coil screw [270] and the pump [260]. During the visit, the buoy apparatus continues to receive sensor measurements of water temperature, pH, salinity and oxygen level and logs this data in the data storage.

The embodiment also shows zinc blocks [299] on the underside of the buoy. The buoy has generally been designed to expose only plastic and no metal on the external surfaces, and plastic tubing with plastic impeller inside the water pump. However, it is difficult to prevent exposure of all metal parts to the water, and furthermore boats with various exposed metal parts may tie to the buoy that has electrical charges within. If only for convenience, zinc blocks are placed on the underside to reduce galvanism, and there are a variety of other standard methods to reduce corrosion.

An alternate embodiment, the seeds to be dispersed are held in their original stalks or pods at the top of the compartment, so that when the seeds are released and therefore ready to germinate, they will accumulate on a plate at the bottom of the compartment, said plate fixed with a weight sensor that will signal the processor the seeds in that compartment are ready to be dispersed and therefore enable activation. It is possible to arrange multiple compartments with seed pods that are of different species or otherwise likely to germinate at different times, and hereby provide a continuous stream of material that is ready to be dispersed at their individually optimum times.

An alternate embodiment uses seedlings in a compartment that are already germinated, together with a solution that fosters their growth and a sensor that determines their size, color, density or a proxy for their maturity, then adjusting the nozzle aperture and releasing the germinated seedlings when they are best able to root in the sea bed. An alternate embodiment uses another compartment with a coating, solution, or different material that will foster rooting of the seedlings in the sea bed. For example, as the seedlings are dispersed, the water flow could shift to add more sand, so that the final mixture is mostly sand that covers the seedlings deposited, holding them in place and giving the seedlings more surface to take root. An alternate embodiment may use a magnifying lens, prism or light to focus sunlight or augment sunlight toward the seedlings in the compartment, as seedlings are dispersed, or on the sea bed where seedlings are dispersed, to promote germination or growth.

FIG. 3 shows an embodiment where multiple units [300] are deployed around an ocean seagrass bed [310]. A compass marking [315] and current direction [317] are indicated on the drawing relative to the seagrass [310]. Each of the units [300] is independently able to perform the functions described for example in FIG. 2. Each of the units [300] is able to receive signals from its own sensors, process signals together with computer code and historical data and predictive models retrieved from its data storage device and determine whether to activate or deactivate its coil screw pump and what adjustments, if any, to make to its nozzle aperture and speed of its pump to generate a target pressure. Each of the units [300] is able to determine this activation and deactivation as default if no signal or directive is received from an external entity, satellite [390], watercraft or person, central control station [395] or other units [300].

FIG. 3 also shows typical mooring buoys [386] that are not apparatus units, within a chart of all the apparatus units [300] and typical buoys [386]. The apparatus buoys [300] are each deployed with signal receivers and processing code to accept signals from approaching boats and interpret those signals to deactivate its coil screw and pump. Boats are encouraged to pay membership dues for use of the apparatus buoys [300] and receive their individually identifying access code. Boats that choose not to join can access the public buoys [386]. Member boats can also access the public buoys [386] but will most likely access the member apparatus units [300] as these are placed closer to preferred dive locations. An example apparatus buoy [305] is within a nature preserve where divers previously paid a visitation fee, and for which the nature park now carries a surcharge with each visit logged by the buoy [305] and signaled to the central station [395] to tally and email a monthly levy to each respective boat owner.

The design or layout of apparatus buoys [300] placed around the reef and southeasterly current as indicated by the current direction [317] and compass marking [315] are to indicate that the system of buoys [300] have been positioned to deliver the effect of the total distribution for the most number of days over the most area of the seagrass or shallow sand. To do this requires knowledge of the prevailing currents over the shallows, which can be obtained from local historical records or from placing a few of the system buoys [300] in advance to collect environmental data before deploying the network of buoys. According to the design, a current direction vane on each apparatus buoy [300] will measure direction linked with a gauge that will measure current speed. The measurement for each buoy will be sent to its processor, along with water temperature and pH at the buoy and from remote sensors submerged at the reef. It may be that the signal sent from submerged gauges cannot be received by all buoys [300] in the region, due to various obstructions, but those buoys [300] that receive the signal will include the data in its processing, composite interpretations and overall data packet that the processors of the apparatus buoys [300] send by signal to the central station [395]. Each sensor, whether remote or attached to a buoy, can have an identifying number as part of its data packet, so that a remote sensor's measurement is not counted multiple times by the processor of the central station [395]. The processor of the central station [395] will log all measurements, identifying numbers and times to its data storage device, and this information will also be compared to previous measurements and activity of the buoys to determine any effectiveness of prior strategies employed. For example, if a manager reviews the units and determines that a large portion of seeds were not distributed at their optimum stage of germination, then this data can be put into the predictive models and the selection protocol for future strategies may change. The central station [395] receives the data from each of the apparatus buoys [300] and also receives data from weather satellite [390] readings of the area as well as predictive models for regional weather. A processor at the central station [395] compiles this data and determines a strategy for the system of apparatus buoys [300]. As an alternative, the processor may send a visual display of the measurements and rank order of strategies considered to a display screen where a manager can review the data and confirm or change the strategy selected. The direction of the apparatus or system can be further modified by signals created through interaction by a manager, operator, driver, or interested parties with the presentation or display. As an alternative, the processor may assign probabilities to the rank order of strategies, and may use a random number generator to select a second rank strategy or even a suboptimal strategy to test empirically the soundness of the processor's decision algorithms, so to further refine its predictive modelling. The processor will then proceed to employ its strategy selected, or alter the strategy and direction if a manager interrupts and commands the processor to do so. The central station then signals each of the apparatus buoys [300] with directions to the processor of each whether to activate its coil screw and pump and for what adjustment to its nozzle, or to deactivate its coil screw and pump. The buoys [300] in the best strategic locations will be activated, while the buoys [303] in unfavorable locations will remain dormant. The overall effect is to generate a distribution pattern to the best shallow locations that need to be cultivated. At other times or days, the current may be flowing in a different direction and at different speed, and the central station may determine a different strategy to activate different apparatus buoys [300] while leaving others inactive.

If the signal from a particular buoy [308] is not received by the central station [395], then the central station [395] will omit its presentation or interpolate its data from the nearest buoys to determine the best strategy. When the central station [395] sends a signal with directions to each of the apparatus buoys [300], each of the buoys [300] will process the signal, follow the directions and return a confirmation signal to the central station [395]. If the central station [395] does not receive a confirmation signal from a particular buoy [308] then the manager at the central station [395] may choose to wait a period of time to determine if the condition corrects, or may direct a member boat to visually observe any deviation to the buoy [308] that would interfere with signal transmission or reception.

As a member boat arrives at a buoy [305] and that buoy [305] deactivates its coil screw and pump, that buoy [305] sends a signal to the central station [395]. The central station [395] may signal a neighboring buoy [306] to increase dispersion to compensate temporarily for the absence of the buoy [305] used by the boat. The buoys [300] continue to monitor readings from their individual sensors and from remote sensors in the area. The data for these readings are sent by signal to the central station [395], which processes the signals and stores data in a central data storage device. The entire set of data can be analyzed to determine effectiveness of the system to disperse seeds and refine predictive models of diel patterns for water temperature, pH, salinity and other factors. On different days, the central station [395] processor can select secondary strategies that might have been predicted to be sub-optimal, to determine and analyze the effectiveness as compared to predicted results, historical results for optimal or comparable strategies, or theoretical estimates for what experts in the field may have projected, estimated or suggested. One strategy that can be tested is to predict pH and water temperature in advance of rainy periods based on weather readings, time of year, historical patterns and whether the pump operated within the past 72 hours. The objective of this strategy would be to test whether turning on the coil screw and pump in advance of weather changes is a more efficient method to mitigate harmful environmental conditions for germination. It is therefore an object of the system strategy to optimize the timing of distribution for maximum germination in target zones.

Figure 3:
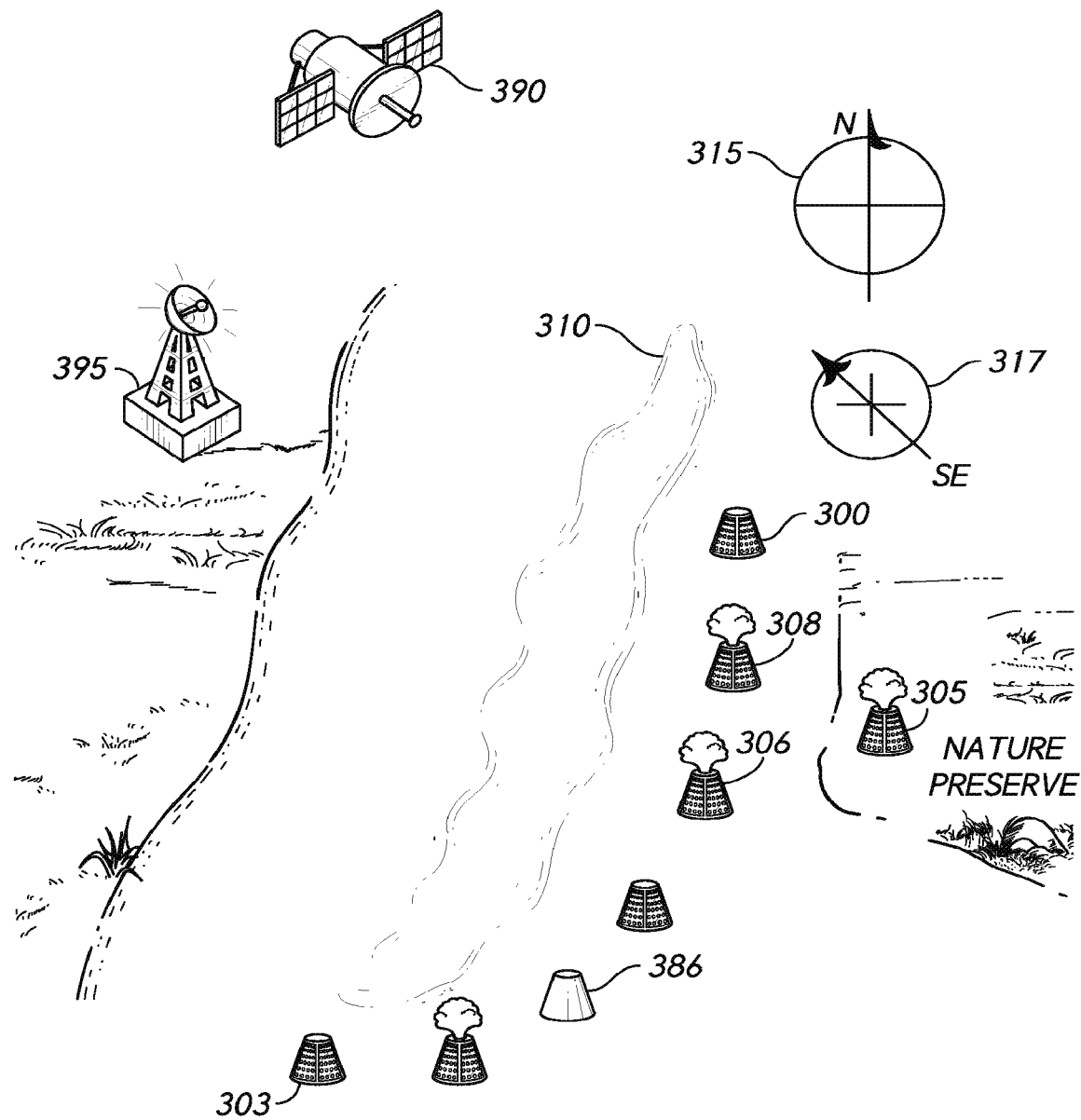
FIG. 3 shows an embodiment where multiple units, providing measurement of independent variables to adjust dispersion of a gas, solid or liquid into an aqueous solution and dispersion of liquid into the air, as a network are deployed over a sea bed.
Figure 4:
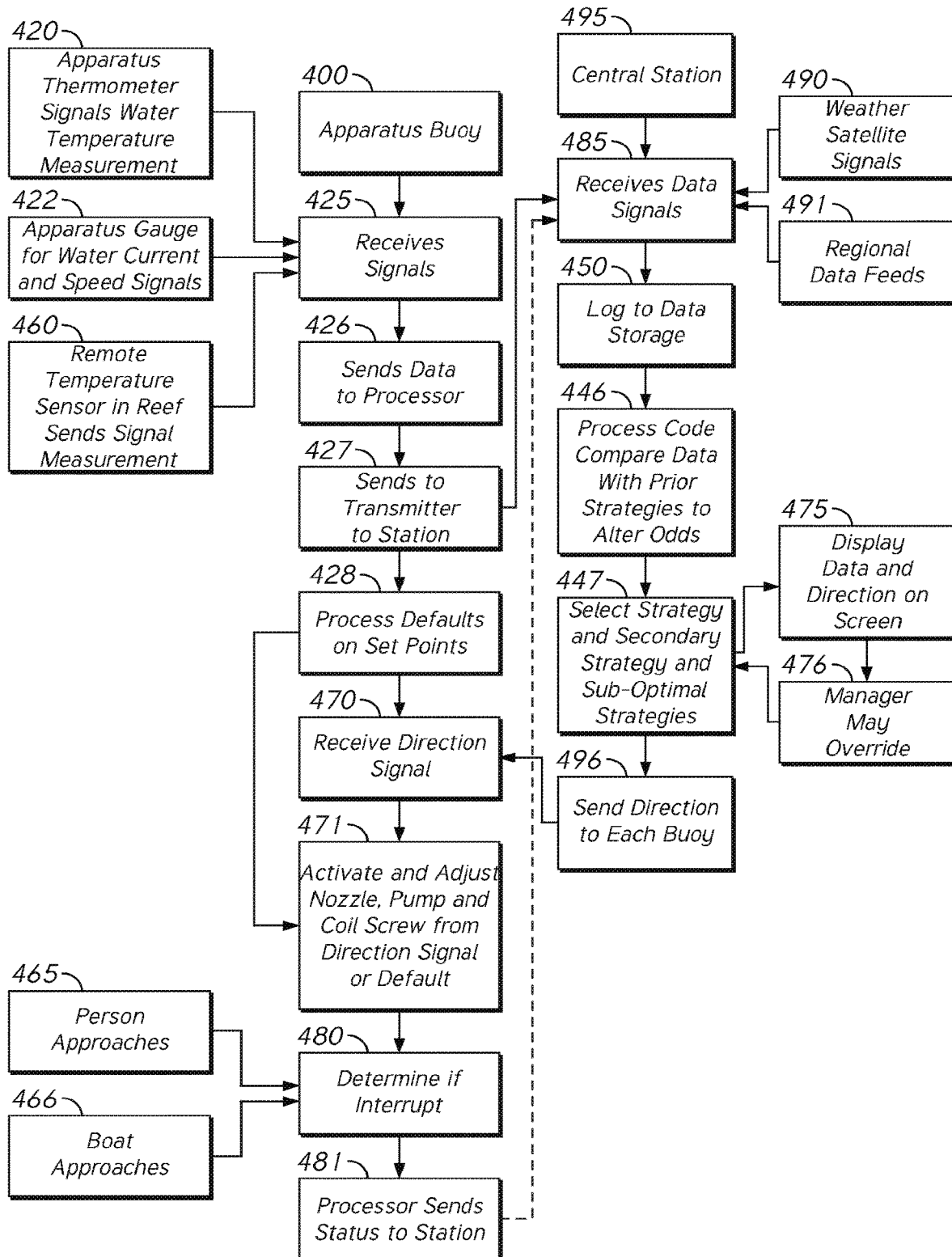
FIG. 4 shows a decision protocol for a system of multiple units similar to the embodiment as depicted in FIG. 3.

FIG. 4 shows a decision protocol for an alternative embodiment of the system depicted in FIG. 3, with the decision protocol for an individual buoy apparatus [400] embodiment as depicted in FIG. 2. If an individual buoy does not receive any signal from the central station [470] then the individual buoy apparatus [400] will default to its individual decision protocol.

In FIG. 4, the individual buoy apparatus [400] has a processor receiving signals [425] from attached sensors such as a water thermometer [420], current direction and speed gauge [422], pH gauge or other sensors. The current direction and speed gauge [422] would indicate if the particular buoy apparatus [400] is in position to disperse seeds over the target area, for example. A current direction and speed gauge [422] could also indicate how to adjust the nozzle aperture to optimize the pressure and therefore the force needed to direct seeds over the target area, for example. The individual buoy apparatus [400] also receives signals [425] sent from remote sensors such as a thermometer in the reef [460], and sends this group of data to its processor [426]. The processor sends this data packet to its transmitter to send [427] to the central station [495]. The processor also proceeds to process a default direction [427] by comparing the sensor measurements to set points.

The central station [495] receives data signals [485] from each individual buoy apparatus [400] and also receives signals [485] sent from weather satellite signals [490], regional data feeds by computer or internet [491] and other information sources. The processor logs this data to its center data storage device [450] and proceeds to process code [446]. In processing code [446], the processor pulls historical data from the data storage device, pulls prediction models and strategic algorithms and the current data for comparison. The processor can also compare current data with prior strategies to assign or alter odds or probabilities that it attaches to strategies as an indication of the success of that strategy, thereby refining its predictive models. From this processing [446], the processor will select a preferred strategy along with secondary strategies and sub-optimal strategies and even disadvantageous actions [447]. The processor may assign probabilities to the rank order of strategies, and may use a random number generator to select a second rank strategy or even a suboptimal strategy to test empirically the soundness of the processor's decision algorithms, so to further refine its predictive modelling. The processor of the central station [495] will display the data and rank order of strategies selected on a computer monitor or display screen for a manager's review [475]. The manager can choose to monitor or can intervene to override [476] the strategy selected. The processor will then proceed to employ its strategy selected, or alter the strategy and direction if a manager interrupts and commands the processor to do so. The processor sends the direction for each individual apparatus buoy [400] by transmitter [496] to the receiver for each individual apparatus buoy [400], which receives its direction signal [470].

Each individual apparatus buoy [400] will activate or deactivate its coil screw and pump and adjust its nozzle or any other actions [471] based on the direction received [470] from the central station [495], or based on its default selection based on set points [428] if no signal was received. If a person approaches [465] or an authorized boat approaches [466] within range to have a signal received, the processor of the individual apparatus buoy [400] processes an interrupt signal to halt the coil screw and pump and ensure there is no interference or danger to the person or boat. The status of the individual apparatus buoy [400], in terms of coil screw, pump, nozzle and other device functions, is transmitted [481] to the central station [495]. The information of the current status is received [485] by the central station [495] and merged with the continuous stream of data on sensor readings received [485] by the central station [495]. Therefore the loop of activity and measurements and processing of decision protocols is an ongoing process.

Figure 5:
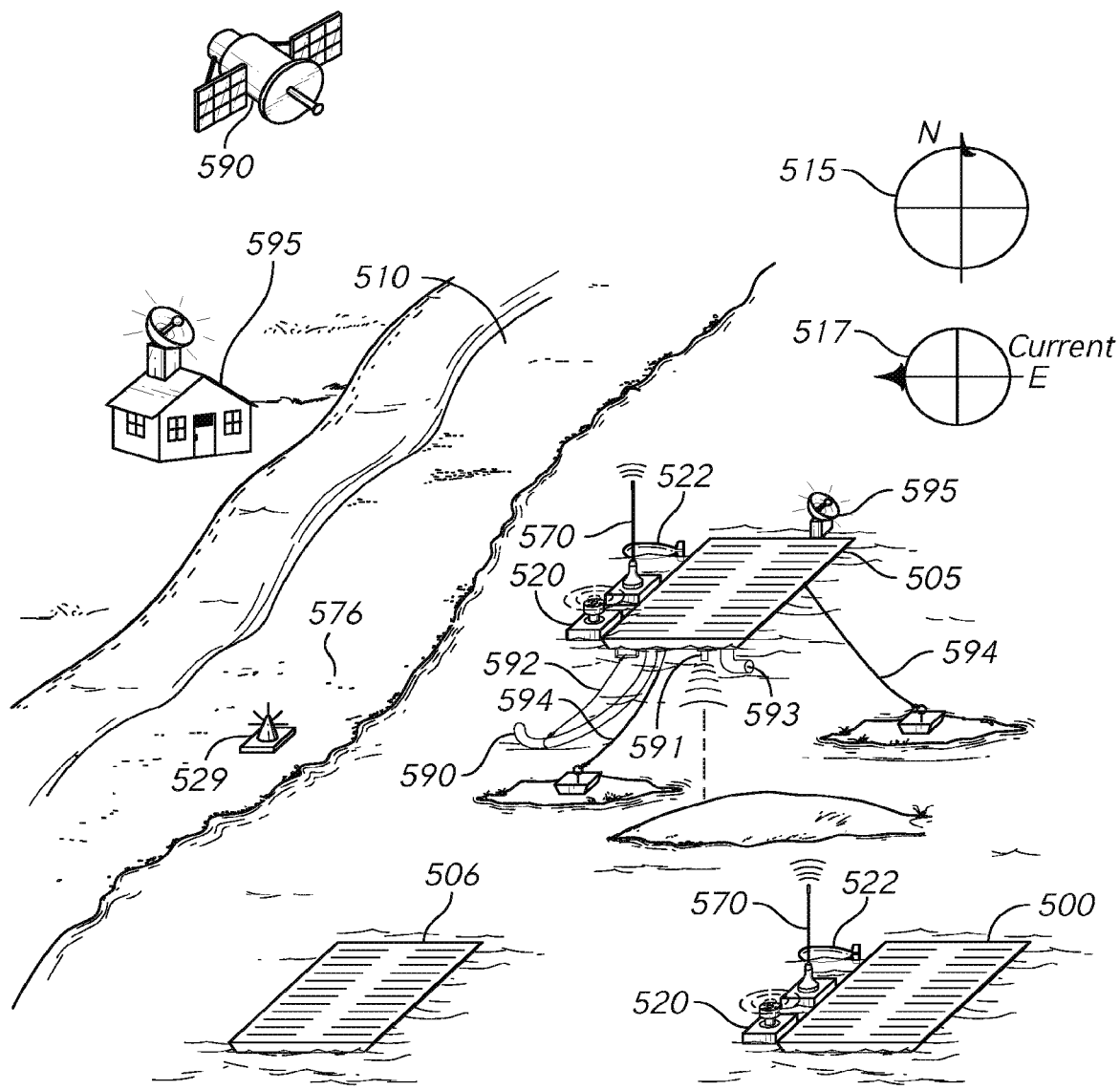
FIG. 5 shows a schematic depiction of an embodiment of the dispersion apparatus with self-propulsion and fixed by two tether lines to direct movement.

FIG. 5 shows a schematic depiction of an embodiment of the dispersion apparatus placed in the ocean along a sandbar

[510]. A compass marking [515] and current direction [517] are indicated on the drawing relative to the sandbar [510]. Each of the apparatus units [500] is independently able to perform the functions described for example in FIG. 2. Each of the units [500] is able to receive signals from its own sensors [520], process signals together with computer code and historical data and predictive models retrieved from its data storage device and determine whether to activate or deactivate its coil screw and pump and what adjustments, if any, to make to its nozzle aperture and speed of its pump to generate a target pressure. Each of the units [500] is able to determine this activation and deactivation as default if no signal or directive is received from an external entity, watercraft or person, central control station [595] or other units [500].

In FIG. 5 the apparatus platforms [500] are each deployed with signal receivers [570] and processing code to accept signals from approaching boats authorized to manage or service the platforms [500] and the processor of each of the platforms [500] will interpret those signals to deactivate its pump. An example platform [505] is placed adjacent to a barren sandbar [576] to be restored with transplanted seedlings. Another example platform [506] is placed at an extreme boundary to the south-southwest (SSW) of a major portion of the sandbar [510].

The design or layout of apparatus platforms [500] placed in the ocean around the sandbar and easterly current as indicated by the current direction [517] and compass marking [515] are to indicate that the system of platforms [500] have been positioned to deliver the distribution for the most number of days over the most critical areas of the sandbar [510]. To do this requires knowledge of the prevailing currents over the sea bed, which can be obtained from local historical records or from placing a few of the system platforms [500] or smaller apparatus buoys in advance to collect environmental data before deploying the entire network of buoys. According to the design, the current gauge [522] on each apparatus platform [500] will measure current direction and speed. The measurement for each platform will be sent to its processor, along with water temperature at the platform and from remote sensors [529] in the sea bed sent to the central control platform [595] and then to the platforms [500], said remote sensors [529] equipped with above surface antennae. It may be that the signals sent from all remote sensors [529] cannot be received by the central control platform [595] or that signals sent from the central control platform [595] cannot be received by all platforms [500] in the region, due to various obstructions, but the central control platform [595] will process its strategy based on the information it receives and transmit to platforms [500] that receive. The central platform [595] receives the data from each of the apparatus platforms [500], from other sensors such as a pH gauge [529] and also receives data from regional weather information sources such as a computer data feed, satellites [590] or government internet reporting services for readings of the locale as well as predictive models for regional weather. A processor at the central platform [595] compiles this data and determines composite interpretations and a best strategy for the system of apparatus platforms [500]. The central platform then signals each of the apparatus platforms [500] with directions to the processor of each whether to activate its pump and at what speed and for what adjustment to its nozzle, or to deactivate its pump. The platforms [500] in the best strategic location will be activated, while the platforms [500] in an unfavorable location will remain dormant. The strategy will account, at a minimum, for the current direction and speed to ensure for each one of the apparatus platforms [500] directed to activate and adjust its coil screw, pump and nozzle, that the fluid from that particular apparatus platform so directed is able to reach the sandbar [510]. The overall effect is to generate a distribution pattern over the sandbar. But more specifically, the manager is trying to deliver seeds to the most critical areas of the sandbar [510] where grasses are needed and best able to grow, and under conditions where the seeds are most likely to grow. In the case of this example, with the easterly current, the platform [505] is able to provide seeds to the best location. At other times or days, the current may be flowing in a different direction and at different speed, and the central platform may determine a different strategy to activate different apparatus platforms [500] while leaving others inactive. At other times or days, the current may be from a SSW direction that makes it advantageous to activate a platform [506] that will provide seeds to other zones and may add some other treatment such as sand to cover the seedlings at to the sandbar [510].

If the signal from a particular platform [500] is not received by the central control platform [595], then the central control platform [595] will omit its data for the current processing interpretation or interpolate its data from the nearest platforms and historical comparison of platforms [500] to determine the best strategy. When the central control platform [595] sends a signal with directions to each of the apparatus platforms [500], each of the platforms [500] will process the signal, follow the directions and return a confirmation signal to the central platform [595]. If the central control platform [595] does not receive a confirmation signal from a particular platform [500] then the manager at the central control platform [595] may choose to wait a period of time to determine if the condition corrects, or may direct a manager to visually observe any deviation to the platform [500] that would interfere with signal transmission or reception, or visit the platform [500] by person or boat to further maintain the platform [500] and correct the deviation.

As an authorized manger arrives at a platform [500] and presents the correct signal, that platform [500] will process the signal and deactivate its coil screw and pump and send a signal to the central control platform [595]. The platforms [500] continue to monitor readings from their individual sensors [520]. The data for these readings are sent by signal to the central control platform [595], which processes the signals and stores data in a central data storage device. The entire set of data can be analyzed to determine effectiveness of the system to provide seedlings. The entire set of data can also be analyzed to refine predictive models of diel patterns for weather, water temperature, pH, salinity or other factors. On different days, the central control platform [595] processor can select secondary strategies that might have been predicted to be sub-optimal, to determine and analyze the effectiveness as compared to predicted results, historical results for optimal or comparable strategies, or theoretical estimates for what experts in the field may have projected, estimated or suggested. One strategy that can be tested is to predict pH, flooding or algal bloom based on weather forecasts, currents and time of year, historical patterns and whether pumps for the platforms [500] operated recently. The objective of this strategy would be to test whether distributing seeds from the platforms [500] in advance of poor periods would be a more efficient method to mitigate future harmful environmental conditions. It is therefore an object of the system strategy to optimize seed distribution to the target area.

It is possible to design the platforms [500] that they can be easily detached from their mooring locations, moved to more advantageous mooring locations, or to store during or in advance of the most adverse weather conditions. The design of the platforms [500] can include an easily accessible area to signal each platform to deactivate its pump, to detach the mooring line or replace the platform with a simple buoy, or detach a part of the platform that serves as a simple buoy to keep the mooring line in place and accessible when the platform is moved. In an alternate embodiment, the shape of the unit is optimized to move through a fluid and motor equipment is included in the unit for self-propulsion, to move the unit as it disperses seeds and thereby extend the range of dispersion. The design of the platforms [500] can be optimized for movement, self-propulsion, transport or storage. The sub-surface shape of the platform can be streamlined to optimize its movement through water, or the outside rails and bottom of the platform can be designed to easily lift and place the platforms in a rack on a boat, or the top of the platform can also be designed to attach a cover and store the platforms in a rack within a building on land. The apparatus units may be optimized for lift and stowage in a rack, or otherwise permit cover or placement for storage. It is possible to collect and store the platforms in advance of gale, hurricane or other adverse conditions. It is possible to rotate a small number of platforms through a multitude of locations and optimize the quantity and rate of water delivered relative to the number of platforms deployed.

In an embodiment, the platform [505] has an extended tube [590] that hangs from the platform toward the sea bed. A sonar device [591] on the platform measures the depth to the sandbar below, signals the processor, which then activates a motor that retracts or extends a rope [592] that is attached near the bottom end of the tube, so that the tube dangles over the sandbar without touching the bottom, distributing seedlings as close as possible to the sand without disturbing the sea bed. In another design, the motor retracts or extends the tube itself. In either design, the water pumping through the tube would force the seedlings out toward the seabed. The platform also has an outlet tube [593] just beneath the surface that can be rotated in all compass directions, either randomly or according to a programmed pattern. Water pumping through this outlet propels the platform along the longitude and latitude of the sandbar. The platform can have two or more tether lines [594] to constrain the movement along a corridor, an ellipse, or other shapes. The embodiment can use GPS [595], proximity sensing to a fixed land-based transmitter or a nearby transmitter extended above the water level on a stick, or other positioning devices to record where the platform has travelled. By this feedback with the processor, the platform can be controlled to cover all areas or cover some areas more than others.

Figure 6:
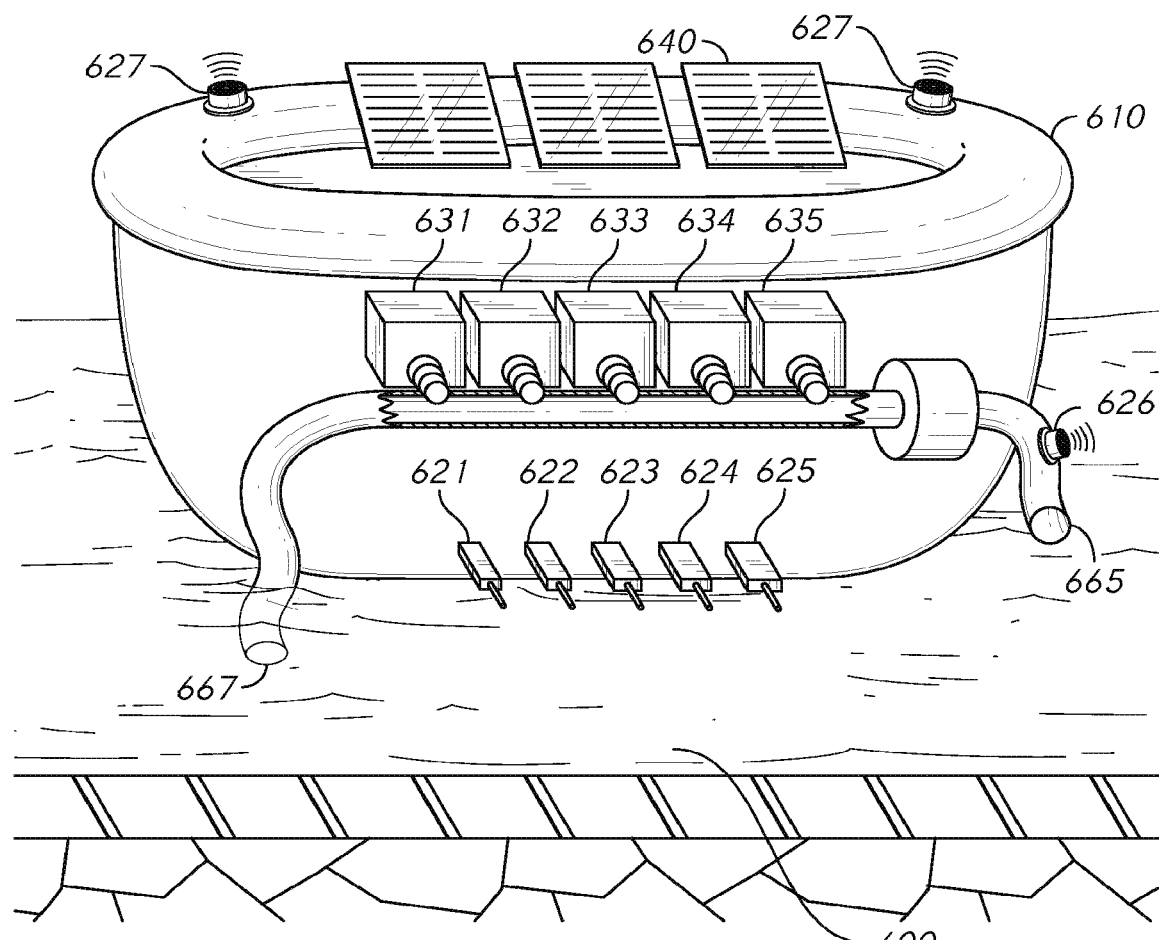
FIG. 6 shows a schematic depiction of an embodiment of the dispersion apparatus for placement in a swimming pool and using several remote probes for pH and people to adjust the dispersion of chlorine and other chemicals.

FIG. 6 shows a schematic depiction of an embodiment of the dispersion apparatus for placement in a swimming pool [600]. The apparatus [610] is physically smaller than the apparatus described in other Drawings but provides the basic functionality for controlled dispersion responsive to an environmental factor. The apparatus [610] is a self-contained, water-tight and ornamental unit that floats in the swimming pool [600], and serves as a more robust management system than the chlorine dispensers that are commonplace. Water management for a swimming pool is more complex than simply adding chlorine. The objective is to kill bacteria, but the chlorine used to kill bacteria must be balanced within the overall pH of the water. Five key measurements are free available chlorine, total chlorine residual, pH, total alkalinity, or calcium hardness. Free available chlorine is used to disinfect and oxidize pathogens. But high chlorine irritates the skin and eyes. The right pH level is needed to make the chlorine effective, and both pH and chlorine levels will affect the pool fixtures and finish. Total alkalinity and calcium hardness can affect pH. A robust management system would include sensors to measure these different factors, shown as sensors [621] [622] [623] [624] and [625]. The apparatus [610] also has five compartments to distribute chemicals. Compartment [631] contains granular chlorine that is kept dry in the compartment until the coil screw mixes it with water as it dispenses. Compartment [632] contains cyanuric acid that stabilizes the chlorine. Compartment [633] contains calcium hypochlorite to adjust pH. Compartment [634] contains algaecide to suppress surface algae. Compartment [635] contains muriatic acid to also adjust pH.

The float [610] contains solar panels [640], interior of the sensors [621] [622] [623] [624] and [625], compartments [631] [632] [633] [634] and [635], device wiring, power converter and mechanics of the pump. The solar panels [640] collect solar energy and the power conversion unit converts this to energy to power the sensors [621] [622] [623] [624] and [625], coil screws for the compartments [631] [632] [633] [634] and [635], and the water pump. It is possible to engineer the power converter to provide priority power through circuitry or by including a processor to devices such as sensors before the pump but otherwise operate the pump as long as there is power sufficient to activate the pump, referred here as "on demand" operation. It is also possible through circuitry or by including a processor to prioritize power to devices such as sensors before the pump, but then only activate the pump when power is above a set point, so that the pump will only activate when sunlight is greater than a minimum intensity. Another sensor [626] that reads water level will act as an interrupt that prevents the pump from activating if there is insufficient water in the basin to operate the pump. It is possible to engineer the circuitry for this interrupt function or to code a processor to accept an interrupt signal and execute directions to deactivate the pump when water level is too low and reactivate the pump when the water level rises above the minimum level. Another proximity sensor [627] interrupts the operation if a person is within an unsafe distance to the unit [610], to ensure chemicals will not be dispensed. The unit [610] can use an extension tube to dispense the chemicals well beneath the water and permit a better dissolution before a person interacts with the mixture dispensed. When the pump operates, it sucks water through the opening [665] in the bottom of the unit [610] and propels it through the outlet [667] of the unit [610] into the water. In general, an embodiment can be designed to sense, test or measure the presence or quantity of a chemical or man-made substance as the independent variable that serves as a basis to determine the distribution or material dispersed. For this embodiment, the apparatus provides a controlled distribution from several compartments into an aqueous solution, the distribution responsive to independent environmental variables, for example the proximity or contact of people to the unit [610].

In an alternate embodiment, the unit [610] has a self-propulsion design to sample and manage more areas of the pool. In an alternate embodiment, the unit [610] has a timer mechanism to manage the distribution more effectively relative to when people are in the pool. In an alternate embodiment, the unit [610] has identifying information to inhibit theft, or positioning equipment that will make the unit [610] inoperable if it is moved a distance from the pool or a central controller.

It is possible to include with the unit [610] a switch, or a receiver to receive a signal that can interrupt the switching or processor to provide an on/off switch to the pump, or to change the set points for when the pump will activate. It is possible to integrate a separate signal transmitter that is fixed or hand-held, or to integrate into existing processors and controllers such as security systems, TV remotes, or computers, or to connect a transmitter to a computer to be controlled through the internet.

An alternate embodiment uses a different design and size of the unit [610] so that it will fit any source of open water, such as a lake or a hot tub. It is an object of the embodiment to provide a flexible apparatus that can be used and moved to manage different locations. An alternate embodiment changes the design to appear as a frog or something playful, common or ornamental.

The descriptions contained herein of the specific embodiments reveal the general nature of the invention that others can, by applying knowledge within the skill of the art, readily modify and/or adapt for various applications of such specific embodiments, without undue experimentation and without departing from the general concept of the present invention. Therefore, such adaptation and modifications are intended to be within the meaning and range of equivalents of the disclosed embodiments, based on the teaching and guidance presented herein. It is understood that the phraseology or terminology herein is for the purpose of description and not of limitation, such that the terminology or phraseology of the present specification is to be interpreted by the skilled artisan in light of the teachings and guidance. While the foregoing has been set forth in considerable detail, it is to be understood that the drawings and detailed embodiments are presented for elucidation and not limitation. Design variations, especially in matters of shape, size and arrangements of parts may be made but are within the principles of the invention. Those skilled in the art will realize that such changes or modifications of the invention or combinations of elements, variations, equivalents or improvements therein are still within the scope of the invention as defined in the appended claims and their equivalents.

What is claimed is:

1. An apparatus, comprising:
   a buoy that floats in a body of water;
   a first sensor to measure a change of an environmental event external to the apparatus;
   a compartment in the buoy that contains at least one organism;
   a second sensor to determine a maturity of the at least one organism;
   a release mechanism to release the at least one organism from the compartment to the body of water external to the apparatus;
   an adjustable aperture nozzle mounted to the buoy and connected to the release mechanism, the adjustable aperture nozzle adjustable through a range of sizes to disperse the at least one organism from the compartment in a rate proportionate to the change of the environmental event as measured by the first sensor to the body of water external to the apparatus, with a quantity of the water from the body of water; and
   a control in communication with the first sensor, the release mechanism, the second sensor, and the adjustable aperture nozzle, the control operable to adjust the release mechanism, and the adjustable aperture nozzle to control dispersion of the at least one organism with the quantity of the water from the body of water in proportion to the change of the environmental event as measured by the first sensor, the controller operable to activate the release mechanism to release the at least one organism when the measurement from the second sensor is determined to reach a set point.

2. The apparatus as recited in claim 1, wherein the at least one organism is composed of at least one of: fish, crustaceans, or plankton.

3. The apparatus as recited in claim 1, wherein the second sensor is operable to sense at least one of a size, a color, a density, a speed or a proxy of the maturity of the at least one organism.

4. The apparatus as recited in claim 1, wherein the environmental event is at least one of temperature, pH, oxygen level, carbon dioxide level, wind, tide, water current, wave or sunlight.

5. The apparatus as recited in claim 1, wherein the adjustable aperture nozzle is adjusted by at least one of opening, closing, turning, rotating, spinning, extending or retracting in addition to adjusting a size of the aperture of the adjustable aperture nozzle in proportion to the environmental event.

6. The apparatus as recited in claim 1, wherein the first sensor is displaced from the apparatus.

7. The apparatus as recited in claim 1, where at least one activity of the apparatus is logged to a data file.

8. The apparatus as recited in claim 1, where the control further adjusts based on a predictive model formed from at least one of an activity of the apparatus, the environmental event or historical data.

9. An apparatus, comprising:
   a buoy that floats in a body of water;
   a first sensor to measure a change of an environmental event external to the apparatus;
   a compartment in the buoy that contains at least one organism, and a second sensor;
   a release mechanism to release the at least one organism from the compartment to the body of water external to the apparatus;
   an adjustable aperture nozzle mounted to the buoy and connected to the release mechanism, the adjustable aperture nozzle adjustable through a range of sizes to disperse a quantity of the at least one organism from the compartment in a rate proportionate to the change of the environmental event as measured by the first sensor, to the body of water external to the apparatus, with a quantity of the water from the body of water; and
   a control in communication with the first sensor, the release mechanism, the second sensor, and the adjustable aperture nozzle, the control operable to adjust the release mechanism and to adjust the adjustable aperture nozzle to control the dispersion of the quantity of the at least one organism with the quantity of the water from the body of water in proportion to the change of the environmental event as measured by the first sensor, the controller operable to adjust a nozzle aperture of the adjustable aperture nozzle and the release mechanism to release the at least one organism based in response to the measurement from the second sensor.

10. The apparatus as recited in claim 9, wherein the at least one organism is composed of at least one of: fish, crustaceans, or plankton.

11. The apparatus as recited in claim 9, wherein at least one activity of the apparatus comprises a previously employed strategy.

12. The apparatus as recited in claim 9, further comprising a pump in the buoy operable to produce a flow of water from the body of water into which the at least one organism released from the compartment is mixed and then pumped through the adjustable aperture nozzle to the body of water external to the apparatus.

13. An apparatus, comprising:

a buoy that floats in a body of water;

a receiver to receive measurements from a remote station to determine a change of an environmental event;

a compartment in the buoy that contains at least one organism, the compartment contains a sensor that determines at least one of a size, a color, a density, a speed or a proxy for a maturity of the at least one organism;

a release mechanism to release the at least one organism from the compartment to the body of water external to the apparatus;

an adjustable aperture nozzle mounted to the buoy and connected to the release mechanism, the adjustable aperture nozzle mechanism adjustable through a range of sizes to disperse a quantity of the at least one organism from the compartment to the body of water external to the apparatus, with a quantity of the water from the body of water; and a control in communication with the receiver, the release mechanism, the sensor, and the adjustable aperture nozzle, the control operable to adjust both the release mechanism and the adjustable aperture nozzle to disperse the quantity of at least one organism with the quantity of the water from the body of water in proportion to the change of the environmental event as measured by the receiver and the measurement from the sensor in the compartment.

14. The apparatus as recited in claim 13, further comprising a liquid or solid that is mixed with the organism to be dispersed.

15. The apparatus as recited in claim 13, wherein the adjustable aperture nozzle is adjusted to create a pre-set pressure determined to optimize the dispersion of the at least one organism.

16. An apparatus, comprising:

a buoy that floats in a body of water;

a first sensor to measure a change of an environmental event external to the buoy;

a compartment in the buoy that contains at least one organism, the compartment contains a second sensor that determines their size, color, density, speed or a proxy for their maturity;

a release mechanism to release the at least one organism from the compartment;

an adjustable aperture nozzle mounted to the buoy and connected to the release mechanism, the adjustable aperture nozzle adjustable through a range of sizes to disperse a quantity of the at least one organism from the compartment with a quantity of the water from the body of water; and a control in communication with the first sensor, the second sensor, the release mechanism, and the adjustable aperture nozzle, the control operable to adjust the release mechanism, and to adjust the adjustable aperture nozzle to control the dispersion of the at least one organism with the quantity of the water from the body of water in proportion to the change of the environmental event and to a desired maturity of the at least one organism.

17. The apparatus as recited in claim 16, wherein the release mechanism is at least one of a propeller, a paddle, an impeller, a bellows, a pressure mechanism, a coil or a screw.

18. The apparatus as recited in claim 16, wherein the buoy further comprises multiple buoy apparatuses, each of the multiple buoy apparatuses communicate data to a central station, the central station analyzing at least one of: data from the buoy, data from one or more remote sensors, and historical data; the central station further determining a strategy for dispersion from the multiple buoy apparatuses based on the analysis and the central station communicating the strategy by directing the multiple buoy apparatuses how and when to disperse.

19. The apparatus as recited in claim 16, wherein the apparatus is further programmed in the event that no communication is received from a central station that the apparatus determines to disperse according to a previous pattern or to disperse according to a strategy the buoy is projected to receive from the central station.

20. The apparatus as recited in claim 16, wherein the buoy further comprises multiple buoy apparatuses.

* * * * *